United States Patent [19]
Rapp

[11] Patent Number: 4,731,924
[45] Date of Patent: Mar. 22, 1988

[54] METHOD AND APPARATUS FOR INSERTING MULTI-LEADED ARTICLES INTO A SUBSTRATE

[75] Inventor: Willard E. Rapp, Franklin Township, Somerset County, N.J.

[73] Assignee: American Telephone and Telegraph Company, New York, N.Y.

[21] Appl. No.: 893,059

[22] Filed: Aug. 4, 1986

[51] Int. Cl.⁴ .................... H05K 3/30; B23P 19/00
[52] U.S. Cl. ............................ 29/837; 29/741; 29/838
[58] Field of Search ............. 29/739, 741, 838, 839, 29/837, 845; 29/564.1, 564.2

[56] References Cited

U.S. PATENT DOCUMENTS

| 3,327,375 | 6/1967 | Reijnhard et al. | |
|---|---|---|---|
| 3,429,039 | 2/1969 | Berg | 29/845 |
| 3,545,064 | 12/1970 | Zemek et al. | 29/741 X |
| 3,611,562 | 10/1971 | Herb | 29/838 X |
| 3,727,284 | 4/1973 | Ragard et al. | |
| 4,063,347 | 12/1977 | Woodman, Jr. | 29/741 X |
| 4,202,092 | 5/1980 | Shibasaki et al. | 29/838 X |
| 4,215,469 | 8/1980 | Asai et al. | 29/838 X |
| 4,293,998 | 10/1981 | Kawa et al. | 29/838 X |
| 4,329,776 | 5/1982 | Mori et al. | 29/741 |
| 4,447,948 | 5/1984 | Golinski et al. | 29/829 |
| 4,503,606 | 3/1985 | Honda et al. | 29/739 X |
| 4,503,610 | 3/1985 | Resch | 29/739 X |
| 4,677,795 | 7/1987 | Ihara | 29/741 |

FOREIGN PATENT DOCUMENTS 181556 5/1986 European Pat. Off. ............. 29/741

Primary Examiner—Howard N. Goldberg
Assistant Examiner—Carl J. Arbes
Attorney, Agent, or Firm—R. B. Levy

[57] ABSTRACT

An apparatus (44) for automatically inserting contact fingers (26) on an edge connector (14) into corresponding apertures (28) in a backplane (10) comprises a nest assembly (77) rotatably mounted to an end (74) of a transfer slide (73). The transfer slide (73) is mounted for movement along a path underlying a rotatable, multi-sided carousel (68), storing a stack of edge connectors on each side thereof, and a ram (49) overlying the backplane. When the transfer slide (73) is displaced to a side of the carousel (68), the nest assembly (77) will engage an endmost edge connector (14) stored on the carousel side. Upon displacement of the transfer slide (73) to the ram (49), the nest assembly (77) rotates to position the contact fingers (26) of the engaged edge connector for insertion in the apertures (28). The ram is then actuated to force the edge connector from the nest assembly towards the backplane to drive the contact fingers into the apertures.

18 Claims, 10 Drawing Figures

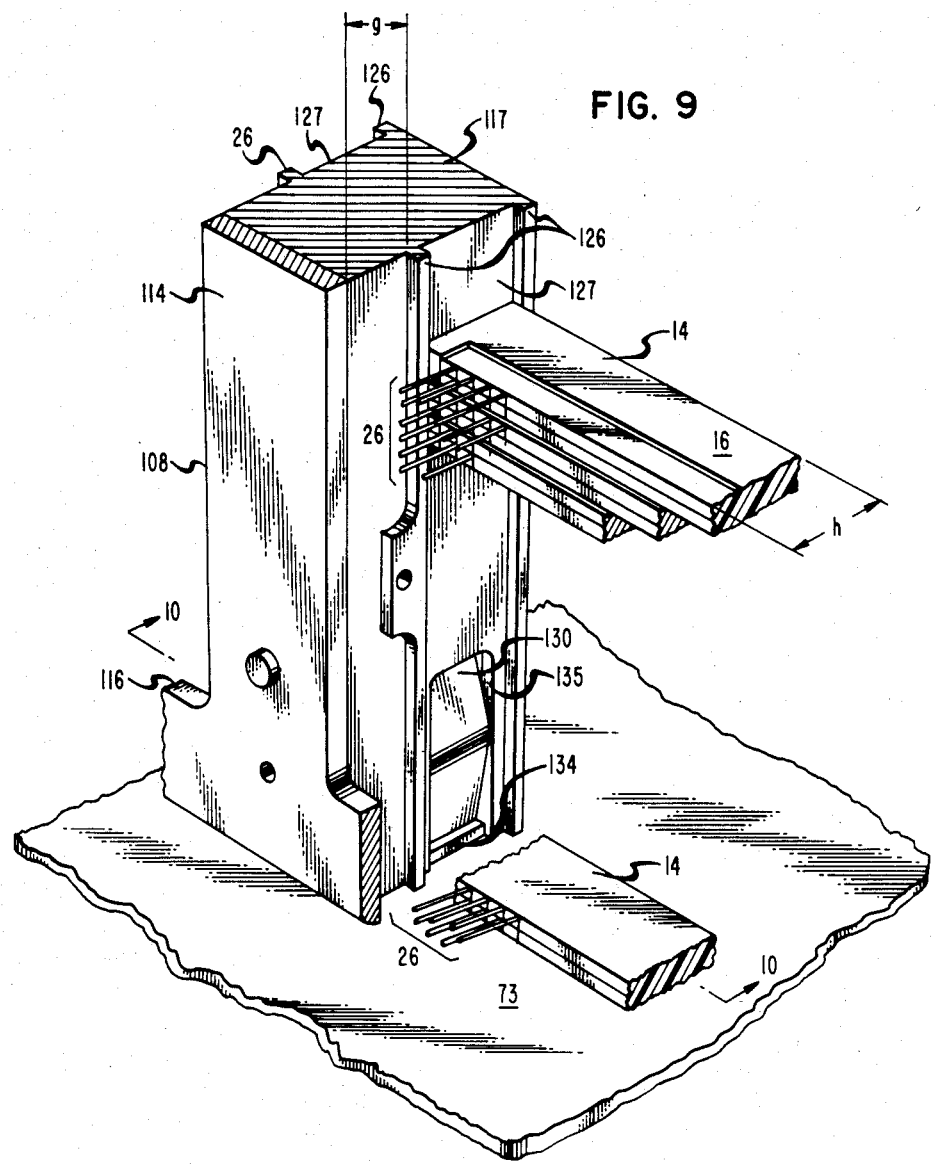

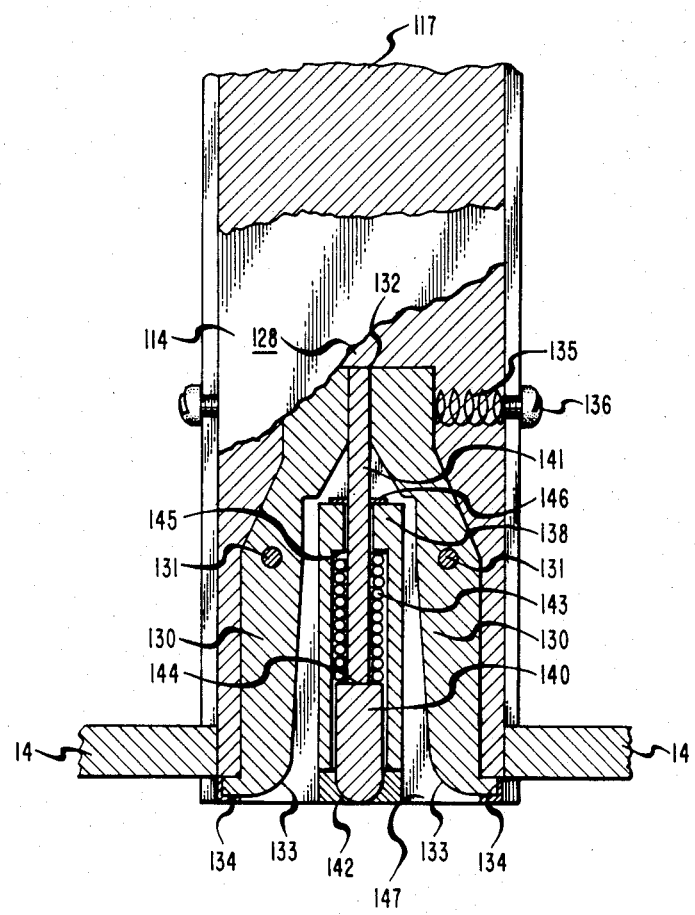

METHOD AND APPARATUS FOR INSERTING MULTI-LEADED ARTICLES INTO A SUBSTRATE

TECHNICAL FIELD

This invention relates to a method and apparatus for inserting leads on a multi-leaded article into apertures in a substrate.

BACKGROUND ART

Many types of electronic equipment are comprised of a plurality of circuit boards, each mounting various electronic components whose leads are interconnected by metallized patterns on one or both major surfaces of the circuit board. The circuit boards are commonly interconnected by a backplane, typically a glass epoxy substrate, which carries a plurality of edge connectors, each making electrical contact with a separate circuit board. Each edge connector is comprised of an insulative body having an opening therein for receiving an end of a circuit board. A plurality of conductive contact fingers each extend into the opening in the body of the edge connector to make electrical contact with a metallized pattern on the circuit board whose end is received in the edge connector.

Each contact finger within the body of the edge connector extends therefrom for insertion through a metal-plated aperture in the backplane. Metallized patterns are provided on one or both of the major surfaces of the backplane to selectively electrically connect together two or more metal-plated apertures in the backplane. The interconnection of the apertures by the metallized patterns on the backplane provides an electrical connection between two or more contact fingers extending from the same or different edge connectors. In this way, the backplane serves to selectively interconnect several circuit boards.

In the past, insertion of the contact fingers of each edge connector through the corresponding apertures in the backplane has been performed manually. In some instances insertion of as many as forty or fifty edge connectors in a single backplane is required, making the fabrication of such backplanes time consuming and expensive. Automation of the process of inserting the contact fingers of the edge connectors into corresponding apertures in the backplane has proven difficult because often a single backplane must carry more than one type of edge connector.

Accordingly, a problem exists in how to achieve automated insertion of contact fingers of an edge connector into corresponding apertures in a backplane.

BRIEF SUMMARY OF THE INVENTION

The foregoing problem is substantially overcome by the method of the present invention for automatically inserting a lead of an article into an aperture in a substrate. The method is initiated by engaging the article in a rotatable member. The member is then moved to position the article engaged therein in registration with the substrate. During the movement thereof, the member is simultaneously rotated so that the lead on the article is positioned for insertion in a predetermined aperture in the substrate. Thereafter, the article is disengaged from the member and displaced towards the substrate to insert the lead into the predetermined aperture therein.

BRIEF DESCRIPTION OF THE DRAWINGS

FIG. 9 is a partial perspective view of another portion of the carousel of FIG. 7; and FIG. 10 is a cross-sectional view taken along the plane 10—10 of FIG. 9.

DETAILED DESCRIPTION

Figure 1:
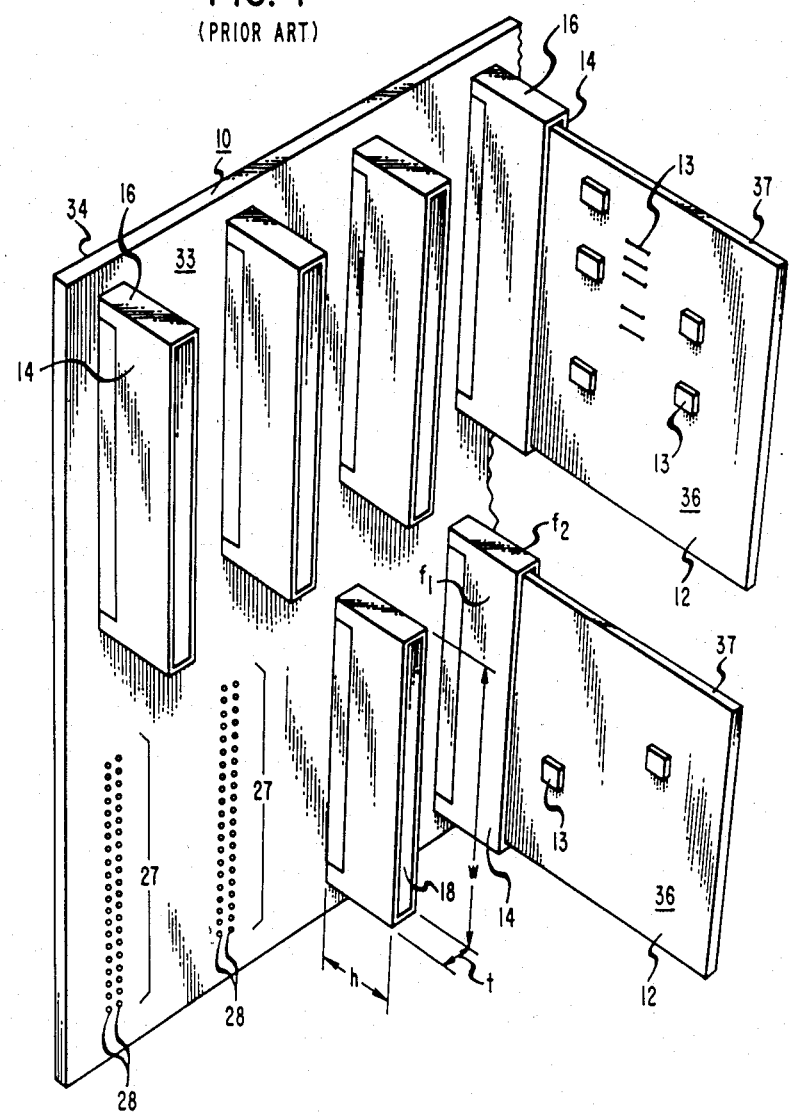
FIG. 1 is a perspective view of a pair of prior art circuit boards interconnected by a backplane.

FIG. 1 is a perspective view of a backplane 10, according to the prior art, connected to a plurality of circuit boards 12, each having a plurality of components 13 thereon. The backplane 10 carries a plurality of edge connectors 14, each comprised of an insulative body 16 (e.g., plastic), of a rectangular cross section, having a width w, a height h and a thickness t. Because of its rectangular cross section, the body 16 has a pair of longitudinal sides $S_1$ and a pair of lateral sides $S_2$.

Figure 2:
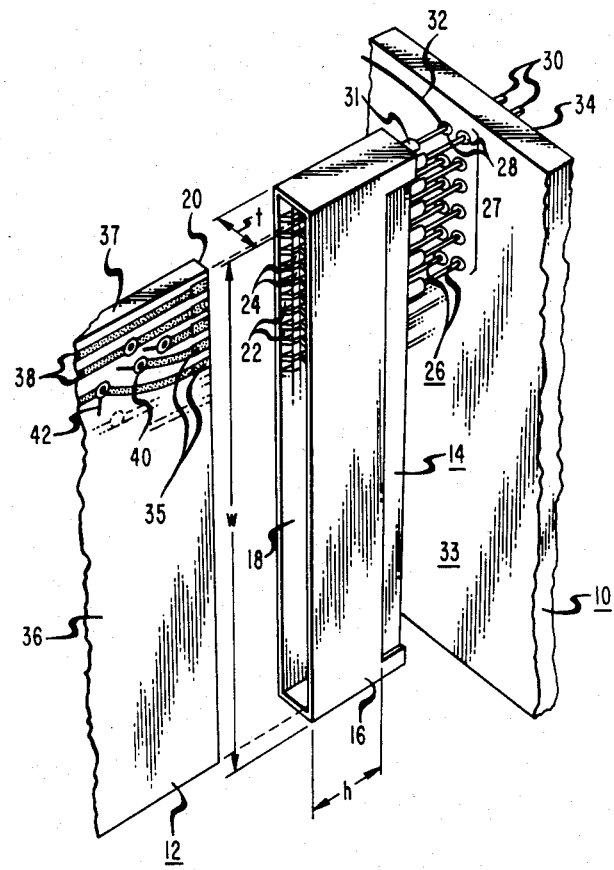
FIG. 2 is a perspective view of one of the circuit boards of FIG. 1, shown in spaced relationship with an edge connector partially inserted into the backplane of FIG. 1.

Referring to FIG. 2, within the body 16 of the edge connector 14 is a rectangular opening 18 which is sized to receive an end 20 of the circuit board 12. Within the opening 18 are a plurality of spaced pockets 22, each lying along a separate one of the longitudinal sides thereof. The pockets 22 along each side of the opening 18 are opposite to the pockets spaced along the other longitudinal side of the opening. Seated within each pocket 22 is an end 24 of an electrically conductive contact finger 26 which extends normally from the housing 16. The contact fingers 26 are arranged the same as a pattern 27 of circular, metal-plated apertures 28 extending through the backplane 10. Typically, the backplane 10 contains a plurality of patterns 27 of apertures 28.

Opposite the end 24 of each contact finger 26 is a square end 30 sized for insertion through a corresponding one of the metal-plated apertures 28 in the backplane 10. Each contact finger 26 has a deformable compliant portion 31 located thereon so as to be situated just outside the body 16 of the edge connector 14 when the end 24 of the contact finger is seated in one of the pockets 22. The compliant portion 31 of each contact finger 26 is cylindrical in shape and is of a diameter slightly larger than that of each aperture 28 so as to be radially deformed when forced into the aperture. The metal-plated apertures 28 in the backplane 10 are selectively connected by a separate one of a plurality of metallized patterns 32 (only one shown) on one or both of a pair of opposed major surfaces 33 and 34 on the backplane.

A plurality of metallized pads 35 are located on both opposed major surfaces 36 and 37 on the circuit board 12 so each pad is adjacent to the end 20 thereof. Each metallized pad 35 is integral with a separate one of a plurality of metallized patterns 38 on a separate one of the major surfaces 36 and 37. The metallized patterns 38 each make electrical contact with one or more metal-plated apertures 40 extending through the circuit board 12. The metal-plated apertures 40 may also be electrically interconnected to each other by metallized patterns (not shown) which are physically and electrically isolated from the metallized pads 35. In practice, the components 13 (see FIG. 1) on the circuit board 12 of FIG. 2 have their leads 42 inserted through, and solder bonded to, a separate one of the metal-plated apertures 40. In this way, selected leads 42 of each component 13 (see FIG. 1) are connected by the metallized patterns 38 to the metallized pads 35.

When the end 20 of the circuit board 12 of FIG. 2 is inserted into the opening 18 of the edge connector 14, each pad 35 makes electrical contact with the end 24 of a corresponding one of the contact fingers 26. The contact fingers 26 of one edge connector 14 are selectively interconnected, via the metallized patterns 32 on the backplane 10, to the contact fingers of one or more other edge connectors. Thus, the pads 35 on each circuit board 12 will be selectively connected to the pads on one or more other circuit boards.

One or more of the components 13 (see FIG. 1) may be of the type which is surface mounted to the circuit board 12, with each component lead 42 solder bonded to a metallized land area (not shown) on one of the major surfaces 36 and 37. Just as the apertures 40 of FIG. 2 are selectively connected to the pads 35 by the metallized patterns 38, so too are the land areas. Thus, one or more leads 42 on each such surface-mounted component 13 (see FIG. 1) may be selectively interconnected to the leads of the components on the same or a different circuit board 12 in the manner described above.

Figure 3:
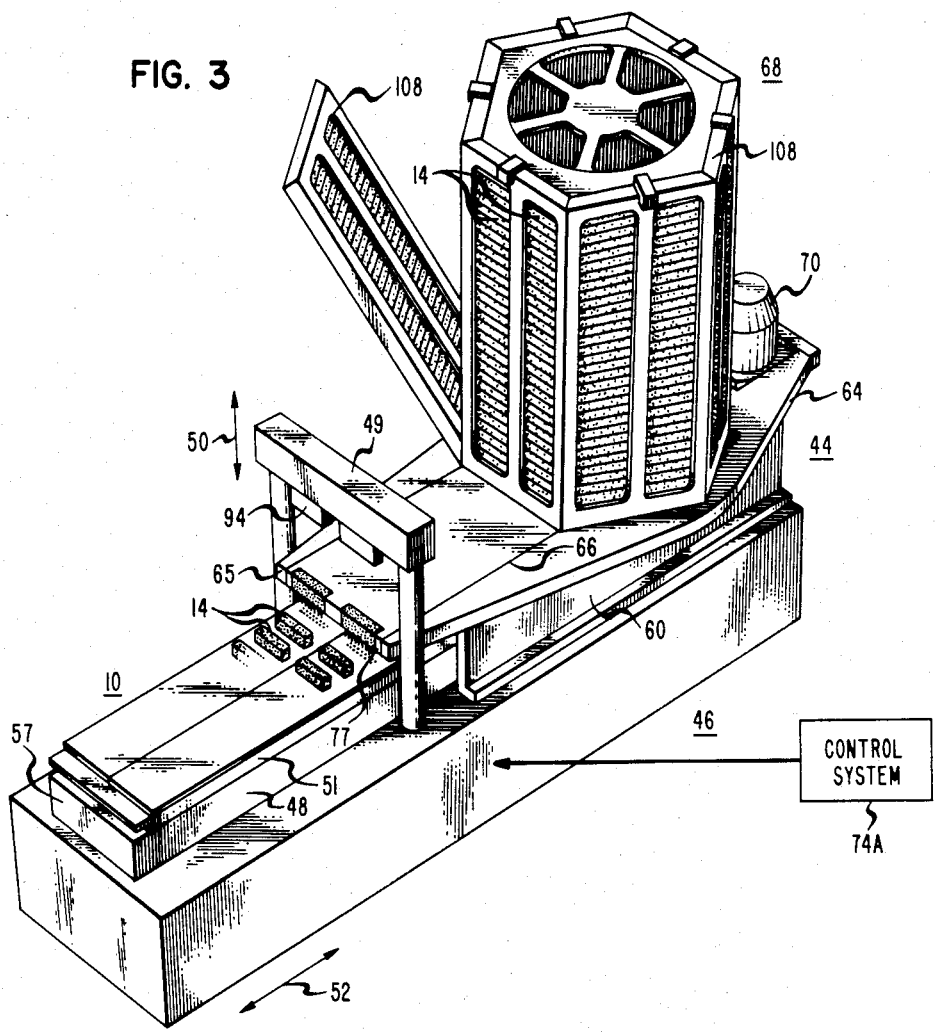
FIG. 3 is a perspective view of an apparatus according to the present invention for automatically inserting edge connectors into the backplane of FIG. 1.

FIG. 3 is a perspective view of an apparatus 44 for automatically inserting the edge connectors 14 into the backplane 10. The apparatus 44 comprises a frame 46, which, in an exemplary embodiment, has a rectangular cross section. A table base 48 is mounted on the frame 46 so that the table base extends underneath a ram 49 slidably mounted to the frame for reciprocal movement along an axis 50 normal thereto. The ram 49 is reciprocated along the axis 50 by means of an actuator (not shown) typically a hydraulic cylinder.

The table base 48 has a table 51 slidably mounted thereto for movement thereon along an axis 52 perpendicular to the axis 50. In practice, the table 51 is sized to carry two backplanes in coplanar relationship. A plurality of openings 53 (best illustrated in FIG. 4) are provided in the top of the table 51 so each opening underlies one or more of the apertures 28. Each opening 53 is deep enough to allow the contact fingers 26 (see FIGS. 1 and 2) of each connector 14 to be inserted through the apertures 28 in each backplane 10 without interference with the table 51. Suitable means (not shown) are provided to releasably secure the backplanes 10 on the table 51.

Figure 4:
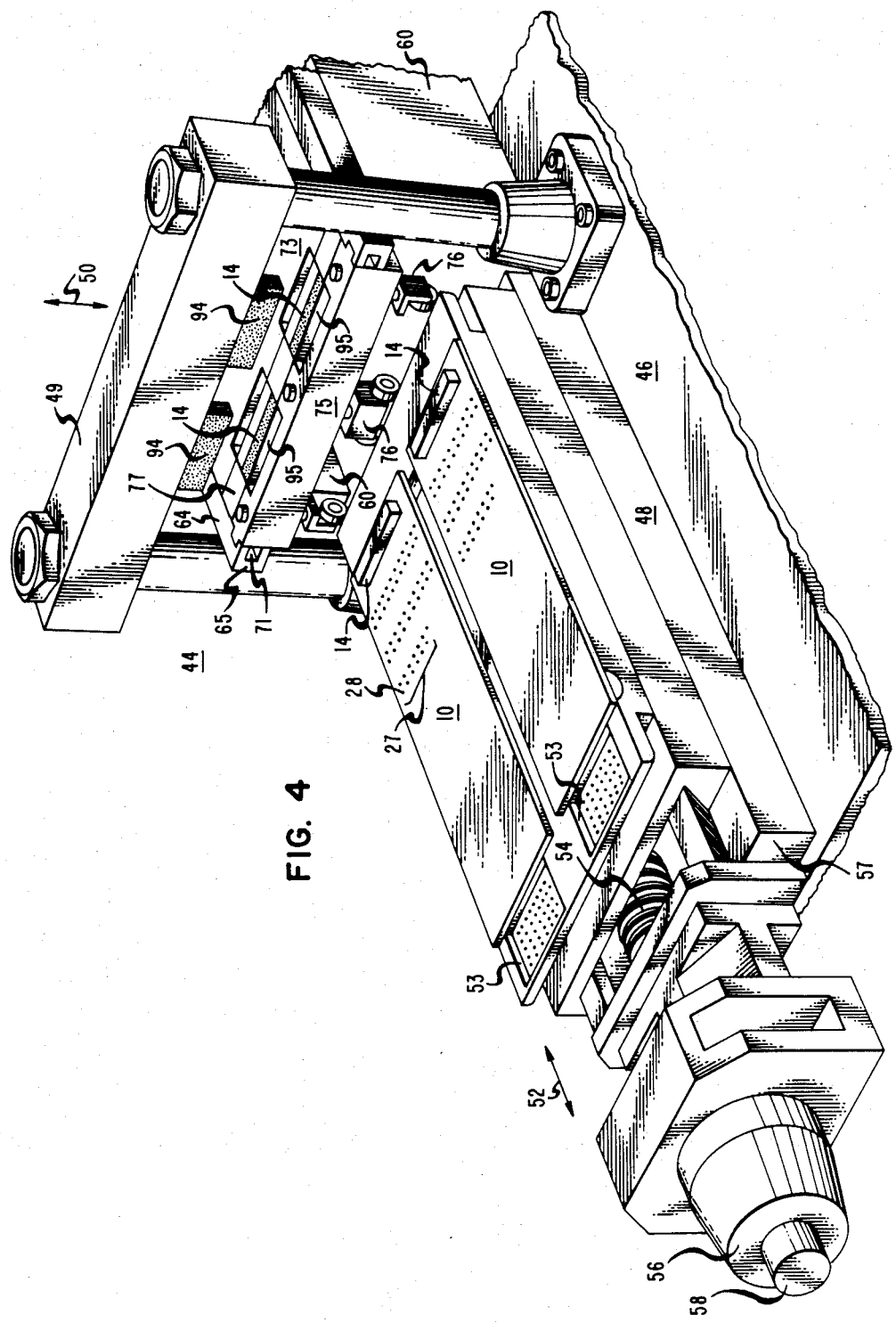
FIG. 4 is a perspective view of a portion of the apparatus of FIG. 3.

Referring to FIG. 4, a lead screw 54 is rotatably journaled in the table base 48 so as to be parallel to the axis 52. The lead screw 54 threadedly engages a lead nut (not shown) secured to the undersurface of the table 51. A servo-motor 56 (seen only in FIG. 4) is attached to an end 57 of the table base 48. The servo-motor 56 is rotatably coupled to the lead screw 54 to impart a torque thereto to displace the table 51 on the table base 48 along the axis 52. In this way, one of the patterns 27 of apertures 28 in each backplane 10 can be indexed beneath the ram 49. A shaft position sensor 58 is attached to the servo-motor 56 for sensing the angular position of the lead screw 54. From the angular position of the lead screw 54 sensed by the sensor 58, the position of the table 51 along the axis 52 can be determined.

As the table 51 moves in a first (generally rightward) direction (as seen in FIG. 4) along the axis 52 underneath the ram 49, the table enters a void between a pair of parallel, laterally spaced walls 60 rising normally from the frame 46. Referring to both FIGS. 3 and 4, the walls 60 extend normally from the frame 46 parallel to the axis 50 to a height just above those of the edge connectors 14 inserted on the backplanes 10 carried by the table 51. As best seen in FIG. 3, the walls 60 support a plate 64 thereon which has an end 65 thereof extending underneath the ram 49 so as to overlay a small portion of the table base 48.

The plate 64 has a rectangular cutout 66 therein extending rightwardly, as seen in FIG. 3, from the end 65 of the plate overlaying the table base 48. The cutout 66 extends beneath a multi-sided carousel 68 which rises normally from the plate 64. The carousel 68, which serves to store a plurality of edge connectors 14 on each side thereof, is rotatably journaled to the plate 64. A motor 70 is attached to the plate 64 and is rotatably coupled to the carousel 68 to index a selected one of the sides thereof opposite the ram 49.

Figure 5:
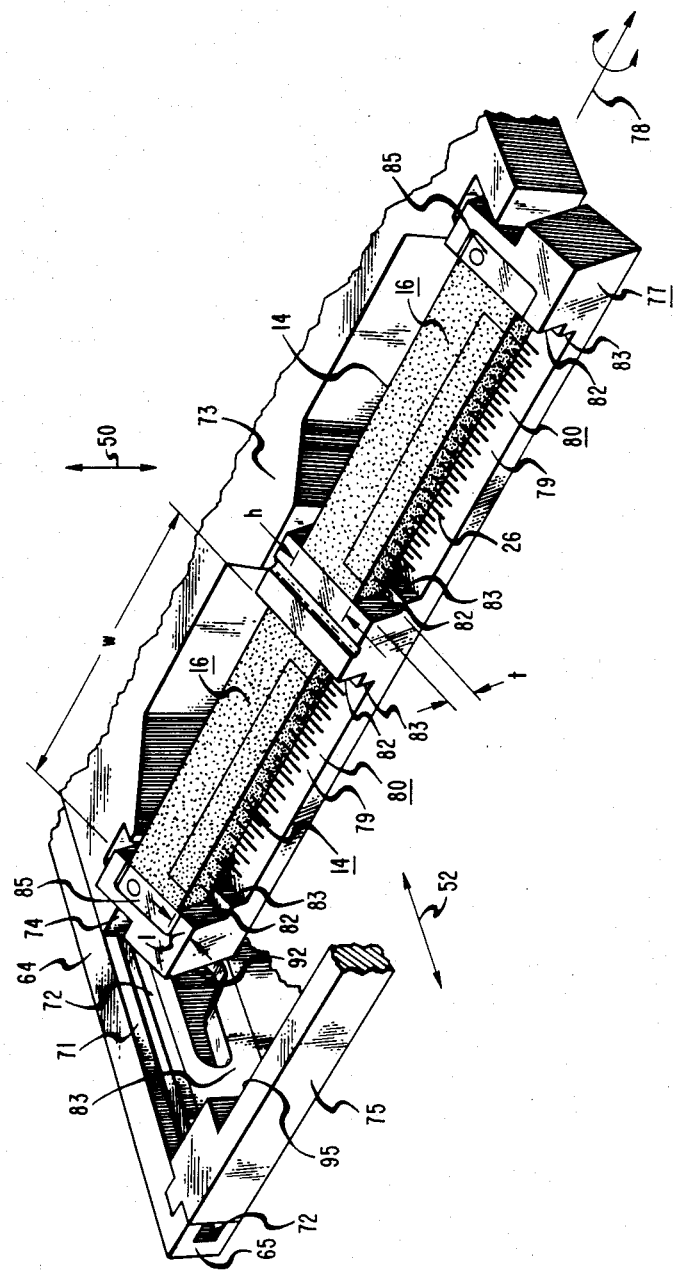
FIG. 5 is a partial perspective view of a portion of the apparatus of FIG. 3 showing the details of a nest assembly thereon.
Figure 6:
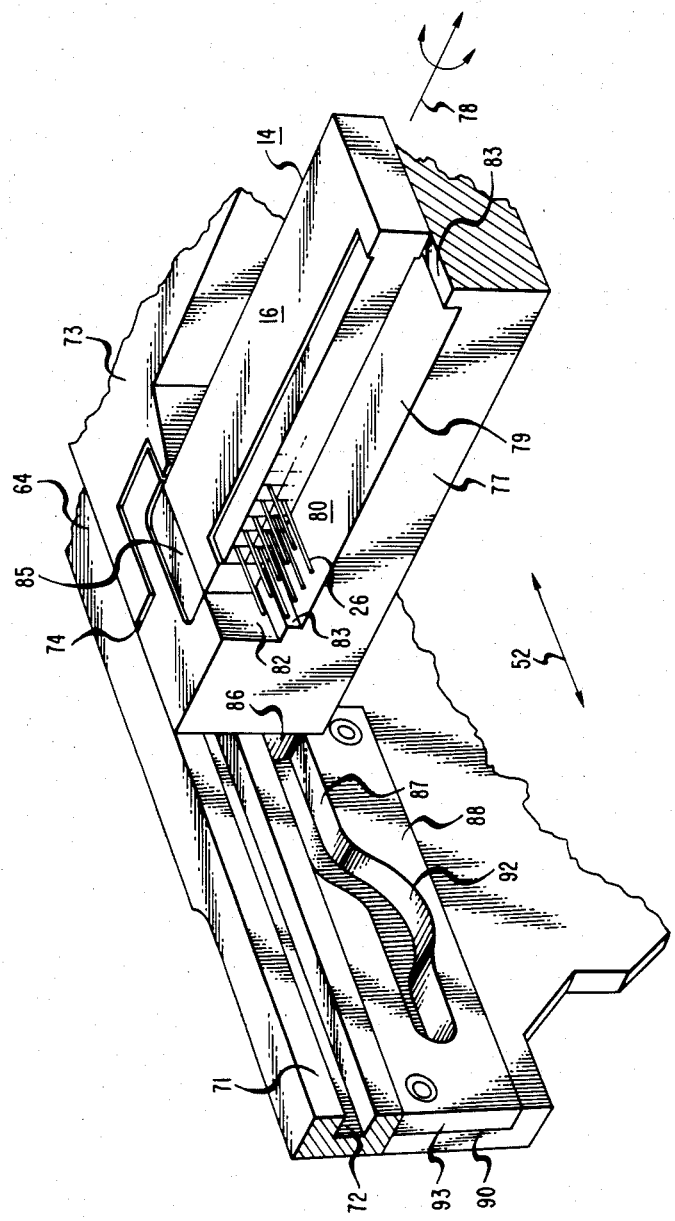
FIG. 6 is a perspective view of part of the nest assembly of FIG. 5.

As seen in both FIGS. 5 and 6, the plate 64 has a pair of interior edges 71 (only one shown), each parallel to the axis 52 and each defining a longitudinal side of the cutout 66 (see FIG. 3). Each edge 71 has a longitudinal groove 72 therein which runs therealong to the end 65 of the plate 64 as seen in FIG. 5. The groove 72 in each edge 71 accommodates a plurality of tongues (not shown) extending laterally from a separate one of the sides of a rectangular transfer slide 73. The tongues allow the transfer slide 73 to move within the cutout 66 (see FIG. 3) along the axis 52. Each edge 71 and each groove 72 therein is of a length greater than the sum of the lateral distance between the carousel 68 (see FIG. 3) and the ram 49 (see FIG. 3) and the length of the transfer slide 73. In this way, an end 74 of the transfer slide 73, which is located closest to the ram 49 (see FIG. 3), can travel between the carousel 68 (see FIG. 3) and the ram when the transfer slide is displaced along the axis 52 by means of an actuator (not shown). In practice, the actuator comprises a pneumatic cylinder or the like.

As seen in FIG. 3, the apparatus 44 includes a control system 74a. The control system 74a is coupled to the motors 56 and 70 and the encoder 58. The control system 74a is also coupled to a pair of electrically actuated valves (not shown) which each control the pneumatic actuators which operate the ram 49 and the transfer slide 73, respectively.

Referring to FIGS. 4 and 5, a rail 75 extends across the end 65 of the plate 64 to close the opening therein to the cutout 66 (see FIG. 3). With reference to FIG. 4, the rail 75 is provided with three spring-biased rollers 76, which depend therefrom to a height just below that of the backplanes 10 on the table 51. The rollers 76 are spaced laterally apart a distance less than the width of each backplane 10 on the table 51. As the backplanes 10 on the table 51 pass underneath the rail 75, the rollers 76 bear against the backplanes to urge them against the table.

As seen in FIGS. 5 and 6, a nest assembly 77, typically having a rectangular cross section, has its ends journaled to the end 74 of the transfer slide 73 for rotation about an axis 78 perpendicular to, but lying in the same plane as, the axis 52. The nest assembly 77 is provided with a pair of spaced pockets 79 (best seen in FIG. 5) in a side thereof. Each pocket 79 is defined by a longitudinal wall 80 and a pair of lateral walls 82 normal thereto. Each lateral wall 82 is separated from the longitudinal wall 80 by one of a pair of lips 83.

The walls 80 and 82, which define each pocket 79, are of a height $h_1$ slightly greater than the combined height h of the body 16 of the edge connector 14 and the length l of the contact fingers 26 extending therefrom. The lateral distance $w_1$ between the walls 82 is on the order of the width w of the body 16 of the edge connector 14, whereas the height $w_2$ of each of the walls 82 is on the order of the thickness t of the body. Each pocket 79 is thus dimensioned to seat one of the edge connectors 14 therein such that one of the longitudinal sides $S_1$ thereof is opposite the longitudinal wall 80 of the pocket. Each edge connector 14 is seated within each pocket 79 so that the contact fingers 26 of the edge connector extend away from the transfer slide 73. A block 85 is pivotally mounted within, and is spring biased from one of the lateral walls 82 of each pocket 79 to releasably retain each edge connector 14 therein.

Referring to FIG. 6, the nest assembly 77 has a pair of rollers 86 (only one shown), each extending laterally outwardly from a separate one of the sides thereof. Each roller 86 is spaced forwardly (leftwardly in FIG. 6) from the axis 78 which passes through the point (not shown) at which the nest assembly 77 is pivotally connected to the transfer slide 73. The rollers 86 each ride in a separate one of a pair of slots 87 (only one shown), each provided in a separate one of a pair of plates 88 (only one shown).

Each plate 88 is mounted in a recess 90 in each edge 71 so as to lie below the groove 72 therein. The slot 87 in each plate 88 is parallel to, but of a shorter length than, each groove 72. As the rollers 86 ride along the slots 87 during the movement of the transfer slide 73 leftwardly in FIG. 6 away from the carousel 68 (see FIG. 3), the vertical spacing between the rollers and the grooves 72 remains constant. For so long as the vertical spacing between the rollers 86 and the slots 72 remains constant, the nest assembly 77 does not rotate. Thus the nest assembly 77 remains oriented such that the contact fingers 26 of each edge connector 14 seated in each pocket 79 are parallel to the axis 52.

The slot 87 in each plate 88 leads into a cammed channel 92 which is located within the plate a short distance from an end 93 thereof closest to the end 65 (see FIG. 5) of the plate 64. As each roller 86 rides along each cammed channel 92 during movement of the transfer slide 73 away from the carousel 68 (see FIG. 3) and towards the rail 75 (see FIG. 5), the vertical spacing between the roller and the slot 72 gradually increases. The increase in the vertical spacing between each roller 86 and each slot 72 causes the nest assembly 77 to pivot counterclockwise about the axis 78, as seen in FIG. 5. Each cammed channel 92 is dimensioned so that when each roller 86 (see FIG. 6) reaches the end thereof, the nest assembly 77, and the two edge connectors 14 carried thereby, will have pivoted counterclockwise 90°. When the nest assembly 77 has pivoted counterclockwise 90°, the contact fingers 26 of the edge connectors 14 in each pocket 79 will now be oriented vertically downwardly, parallel to the axis 50 rather than parallel to the axis 52.

Referring to FIG. 4, the length of each cammed channel 92 (see FIGS. 5 and 6) is such that once the roller 86 (see FIG. 6) riding therealong reaches the end thereof, the nest assembly 77 lies directly beneath the ram 49. When the nest assembly 77 is positioned directly beneath the ram 49 of FIG. 4, each pocket 79 (see FIG. 5) in the nest assembly underlies one of a pair of insertion tools 94 depending from the ram. Each insertion tool 94 depends from the ram 49 a sufficient distance so that when the ram is displaced downwardly along the axis 50 to the height of the plate 64, the insertion tools pass through the pockets 79 (see FIGS. 5 and 6).

As each insertion tool 94 passes through each pocket 79 (see FIGS. 5 and 6), the edge connector 14 seated in the pocket is disengaged therefrom by overcoming the lateral forces of the spring-biased blocks 85 and is displaced downwardly. This causes the contact fingers 26 (see FIGS. 2, 5 and 6) of each edge connector 14 to be driven into the corresponding apertures 28 of the pattern 27 in the backplane 10 indexed beneath the insertion tool 94. To allow for clearance of the insertion tools 94, the end rail 75 is provided with a pair of recesses 95 (see FIG. 5) therein, each opposite to a separate one of the pockets 79 in the nest assembly 77.

Figure 7:
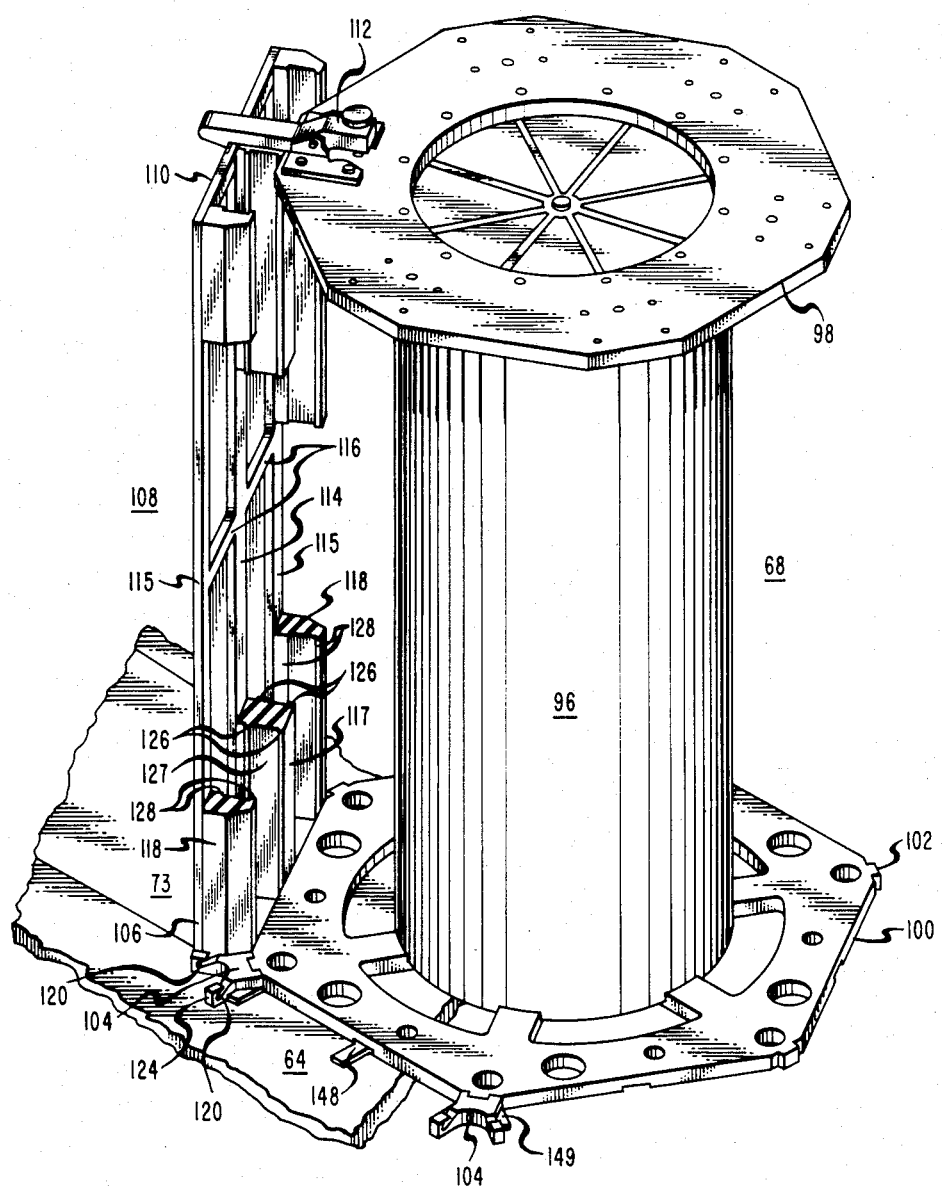
FIG. 7 is a perspective, partially cutaway view of a carousel comprising a portion of the apparatus of FIG. 3.

Referring to FIG. 7, there is shown a perspective, partially cut away view of the carousel 68 showing the details thereof. In an exemplary embodiment, the carousel 68 is comprised of a cylinder 96 whose ends are each attached to one of a pair of hexagonally shaped plates 98 and 100. The plates 98 and 100 are parallel to each other and normal to the longitudinal axis of the cylinder. The plate 100 is rotatably journaled to, but spaced from, the plate 64 by means not shown.

Figure 8:
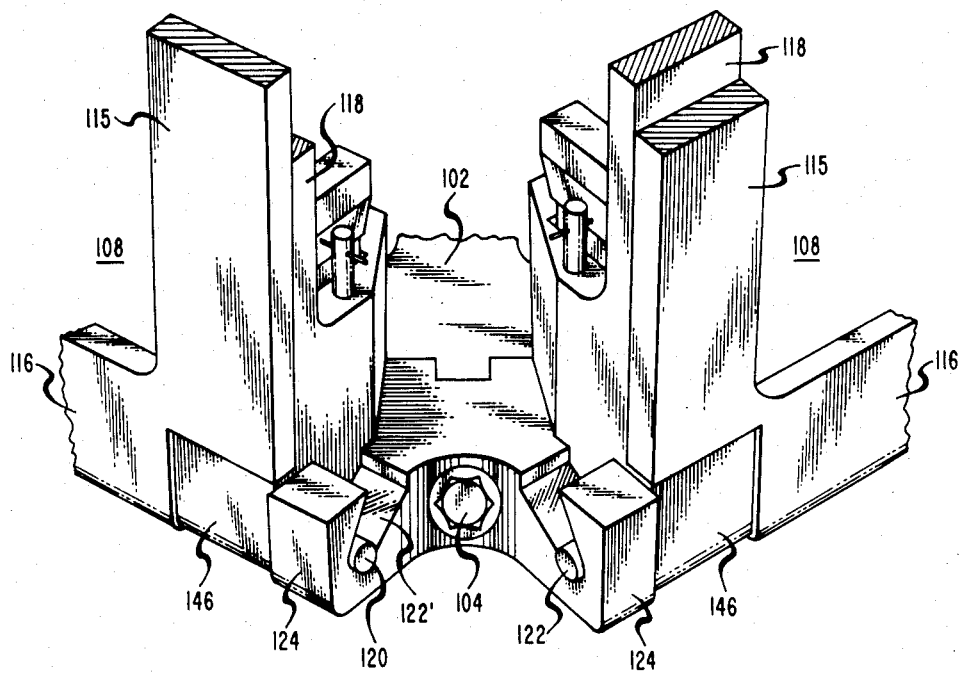
FIG. 8 is a partial perspective view of a portion of the carousel of FIG. 7.

A boss 102 extends laterally outwardly from each of the six corners of the plate 100 for mounting a "Y"-shaped holder 104 thereto. Each holder 104 is secured to its corresponding boss 102 by a bolt 105 as seen in FIG. 8. As seen in FIG. 7, a pair of the holders 104, each secured to an adjacent pair of the bosses 102 on the plate 100, serves to hinge one end 106 of an edge connector carrier 108 thereto. Each carrier 108 has its end 110 opposite the end 106 releasably secured to the plate 98 by a latch 112. With the plates 98 and 100 hexagonal in shape, the carousel 68 of FIG. 3 is thus capable of carrying six edge connector carriers 108 (although only one is shown in FIG. 7).

Each carrier 108 is comprised of a central longitudinal rib 114 and two outer longitudinal ribs 115. Each rib 115 is parallel to the rib 114, but is spaced laterally therefrom by a distance on the order of the width w of the body 16 (see FIGS. 1 and 2) of the edge connector 14 of FIGS. 1 and 2. Each of the ribs 115 is joined to the rib 114 by a plurality of lateral struts 116 integral therewith. A longitudinal wall 117 is attached to the rib 114 so as to be interposed between the rib and the plates 98 and 100. Each of a pair of longitudinal walls 118, having the same dimensions as the wall 117, is attached to a separate one of the ribs 115 so as to be interposed between the respective rib and the plates 98 and 100.

Referring to FIGS. 7 and 8, each wall 118 has a pin 120 projecting laterally therefrom a short distance up from the bottom thereof for receipt in an inclined slot 122 in one of a pair of legs 124 on each holder 104. Once each latch 112 (see FIG. 7) is released, each carrier 108 can be pivoted away from the cylinder 96 (see FIG. 3) about the pins 120. After each carrier 108 has been pivoted away from the cylinder 96 (see FIG. 3), the carrier can be lifted to completely disengage the pins 120 from the slots 122 in the legs 124 (see FIG. 7).

Referring to FIGS. 7 and 9, the wall 117 on the centermost rib 114 has a pair of longitudinal lips 126 running along each of a pair of opposed surfaces 127 on the wall. The lips 126 running along each surface 127 of the wall 117 are each opposite to a separate one of a pair of lips 128 running along each of the walls 118 as seen in FIG. 7. With reference to FIG. 9, the lips 126 of each pair on the wall 117 are laterally spaced apart on the order of the height h of the body 16 of the edge connector 14. The lips 128 (see FIG. 7) on the walls 118 (see FIG. 7) are spaced laterally apart the same distance. In this way, a plurality of edge connectors 14, stacked with one of the longitudinal sides $S_1$ thereof resting on the longitudinal side of the one therebeneath, may be confined between one pair of lips 126 on the wall 117 and the lips 128 on one of the walls 128 of FIG. 7. Each carrier 108 thus carries two stacks of edge connectors 14.

As seen in FIG. 9, a gap g exists between the rib 114 and the closest one of each of the pair of lips 126 running along the surfaces 127. A similar gap (not shown) exists between each rib 115 of FIG. 7 and the closest one of the pair of lips 128 running along each wall 118. These gaps g allow the contact fingers 26 of the edge connectors 14 confined between the lips 126 and 128 (see FIG. 7) to extend horizontally towards the ribs 114 and 115, respectively (see FIG. 7), without any interference therewith.

Referring to FIG. 9, the lowermost edge connector 14 of each of the pair of stacks thereof (only one shown) stored in the carrier 108 (see FIG. 7) indexed opposite the ram 49 (see FIG. 3) will be supported by the transfer slide 73. Each of the lowermost pair of the edge connectors 14 of the stacks stored in other carriers 108 is supported by the plate 64 (see FIG. 3). If any of the carriers 108 are disengaged from the carousel 68 of FIGS. 3 and 7, then the edge connectors 14 stored in the carrier can fall out because there is nothing to support the lowermost pair of edge connectors. To prevent such a condition, a stop mechanism 128, best seen in FIG. 10, is provided within the wall 117 and a stop mechanism (not shown) is provided within each of the walls 118. The stop mechanism 128 in the wall 117 and the ones in the walls 118 releasably engage the lowermost pair of edge connectors 14 stored in each carrier 108. Only the stop mechanism 128 within the wall 117 will be described in detail since the stop mechanism in each of the walls 118 is virtually identical thereto.

The details of the stop mechanism 128 within the wall 117 are best illustrated in FIG. 10. The stop mechanism 128 comprises a pair of fingers 130, each rotatably mounted within the wall 117 by a separate one of a pair of pivot pins 131. Each pivot pin 131 extends through each finger 130 just above the midpoint thereof. The fingers 130 each have a top 132 and a bottom 133 vertically offset from each other so the tops of the fingers are closer to each other than the bottoms thereof. A tab 134 extends laterally from the bottom 133 of each finger 130 through a separate one of a pair of openings 135 (only one shown in FIG. 9) through the wall 117. As seen in FIG. 9, each opening 135 is located between the lips 126 on each of the surfaces 127 of the wall 117.

Referring to FIG. 10, the tab 134 on each finger 130 of FIG. 10 is of a predetermined length. The length of each tab 134 is such that only when the tops 132 of the fingers 130 abut each other will the tabs protrude through the openings 135 (see FIG. 9) and beyond the surfaces 127 on the wall 117. When the tabs 134 on the fingers 130 protrude beyond the surfaces 127 (see FIG. 9) on the wall 117, each tab engages one end of each of the lowermost pair of edge connectors 14 stored in the carrier 108 (see FIG. 7). Each of a pair of springs 135 is interposed between a separate one of a pair of screws 136, threaded into opposite sides of the wall 117, and the top 132 of one of the fingers 130. Each spring 135 biases the top 132 of each finger 130 towards the top of the other finger.

A sleeve 138, perpendicular to the pivot pins 131, is situated within the wall 117 between the fingers 130 so as to lie below the tops 132 thereof. Slidably mounted within the sleeve 138 is a plunger 140 having upper and lower ends 141 and 142 extending above and below the top and bottom, respectively, of the sleeve. The plunger 140 is biased downwardly, as seen in FIG. 10, from the sleeve 138 by a spring 143 interposed between a shoulder 144 on the plunger and a shoulder 145 at the top of the sleeve. A pin 146 extends through the upper end 141 of the plunger 140 to prevent the plunger from leaving the sleeve 138. For so long as no upward force is applied to the plunger 140 against the downward force of the spring 143, the upper end 141 of the plunger remains just below the top 132 of each of the fingers 130. At the same time, the lower end 142 of the plunger 140 will protrude below the sleeve 138 and into a recess 147 in the bottom of the wall 117.

Referring to FIG. 7, a plurality of tabs 148 extend laterally outwardly from the plate 100, each tab lying midway between a pair of the holders 104. While the lower end of each carrier 108 is engaged by a pair of holders 104, each tab 148 occupies the recess 147 (see FIG. 10) in the bottom of the wall 117 of the carrier. Referring to FIG. 10, when the tab 148 (see FIG. 7) is present within the recess 147, the plunger 140 will be biased upwardly thereby against the spring 143. As a result, the upper end 141 of the plunger will move between the tops 132 of the fingers 130 to separate them. While the tops 132 of the fingers 130 remain separated from each other, the tab 134 on each finger remains inside the wall 117 and out of engagement with one of the pair of lowermost edge connectors 14 in the carrier 108 (see FIG. 10). Thus, the end of each of the pair of lowermost edge connectors 14 closest to the wall 117 is thus free to drop below the tab 134.

With reference to FIG. 7, once the carrier 108 is disengaged from the holders 104, the plunger 40 (see FIG. 10) is no longer biased upwardly against the spring 143 (see FIG. 10) by the tab 148. Hence, the tabs 134 (see FIG. 10) on the fingers 130 (see FIG. 10) each protrude through each opening 135 (see FIG. 9) to engage an end of one of the pair of lowermost edge connectors 14 (see FIG. 10) carried by the carrier 108 of FIG. 7.

The stop mechanism (not shown) within each of the walls 118 on the carrier 108 of FIG. 7 is identical to the stop mechanism 128 described with respect to FIG. 10 except for one small difference. The stop mechanism within each of the walls 118 contains only one finger 130 rather than the pair of fingers of the stop mechanism 128 in FIG. 10. While each carrier 108 of FIG. 7 remains engaged with a pair of the holders 104, the stop mechanism within each of the walls 118 is released by one of a pair of wings 149 each extending laterally outwardly from a separate one of the legs 124. Each wing 149 serves the same purpose as each tab 148 on the plate 100 described previously.

Referring to FIG. 3, operation of the apparatus 44 to achieve automated insertion of the edge connectors 14 into the backplanes 10 is accomplished by first mounting the backplanes 10 on the table 51. The edge connectors 14 required for insertion in the backplanes 10 are loaded into one or more of the carriers 108 after disengagement thereof from the carousel 68. Once having been loaded with the edge connectors 14, each carrier 108 is then mounted on a separate side of the carousel 68. Loading of the carriers 108 can also be accomplished while they are mounted to the carousel 68, although it is better to load the carriers once they have been disengaged.

Next, the control system 74a causes the table 51 of FIGS. 3 and 4 to be indexed on the table base 48 to locate the apertures 28 in a selected one of the patterns 27 (see FIG. 4) in each backplane 10 beneath each insertion tool 94 depending from the ram 49. Also at this time, the control system 74a causes the carousel 68 to be indexed to position the carrier 108, which contains the proper edge connectors 14 for insertion, opposite the ram 49. Thereafter, the control system 74a causes the transfer slide 73 to be displaced along the axis 52 to position the nest assembly 77 directly beneath the carrier 108 now opposite the ram 49. The lowermost edge connector 14 in each of the pair of stacks held by the carrier 108 will slide into a corresponding one of the pockets 79 (see FIG. 5) as the nest assembly 77 moves beneath the carrier.

Next, the transfer slide 73 is displaced from the carousel 68 towards the ram 49 to position each of the edge connectors 14 now carried by the nest assembly 77 beneath a separate one of the insertion tools 94. As the nest assembly 77 is displaced towards the ram 49, the nest assembly rotates counterclockwise 90° about the axis 78 (see FIGS. 5 and 6). The contact fingers 26 (see FIGS. 2, 5 and 6) of each edge connector 14 carried by the nest assembly 77 now become perpendicular to and point downwardly toward each backplane 10.

Once each edge connector 14 in each pocket 79 (see FIG. 5) underlies each insertion tool 94, the fingers 26 (see FIGS. 2, 5 and 6) of each edge connector will be in registration with the apertures 28 indexed beneath the insertion tool. The ram 49 is then displaced downwardly (see FIGS. 1 and 2) along the axis 50 under the control of the control system 74a so that each insertion tool 94 enters a separate one of the pockets 79 (see FIG. 5) in the nest assembly 77. The insertion tools 94 each disengage the edge connector 14 from a corresponding one of the pockets 79 (see FIGS. 5 and 6) and displace the edge connector towards the corresponding backplane 10 therebeneath.

As the edge connectors 14 are displaced towards the backplanes 10, the contact fingers 26 (see FIGS. 2, 5 and 6) on each edge connector enter the apertures 28 in registration therewith. The downstroke of the ram 49 along the axis 50 is sufficient to drive the compliant section 31 (see FIG. 2) on each contact finger 26 (see FIG. 2) into each aperture 28 for retention therein and electrical contact therewith. In this way, each edge connector 14 is secured to the corresponding backplane 10.

Once the contact fingers 26 (see FIGS. 2, 5 and 6) of each of the pair of edge connectors 14 are inserted into the apertures 28 in a separate one of the backplanes 10, the ram 49 is displaced upwardly along the axis 50. To insert another edge connector 14 in each backplane 10, the previously described steps are repeated. As may now be appreciated, the apparatus 44 is operated in an automated fashion by the control system 74a.

Different types of edge connectors 14 can be inserted automatically into the pair of backplanes 10 on the table 51 by appropriately indexing the carousel 68 to position the carrier 108 containing the requisite type of edge connectors opposite to the ram 49. Each of the six separate carriers 108 on the carousel 68 can be loaded with a different type of edge connector 14. Thus, six different types of edge connectors 14 can be automatically inserted in each of the pair of backplanes 10 carried by the table 51. Those skilled in the art will appreciate that the apparatus 44 of FIG. 3 could be modified to increase the number of sides on the carousel 68 to allow for a greater number of carriers 108 to be engaged thereby. Thus, a greater variety of edge connectors 14 could be automatically inserted by apparatus 44.

It is to be understood that the embodiments herein decribed are merely illustrative of the principles of the present invention. Various modifications and changes may be made by those skilled in the art which will embody the principles of the invention and fall within the spirit and scope thereof.

What is claimed is:

1. A method for inserting a lead on an article into an aperture in a substrate comprising the steps of:
   removably engaging the article in a rotatable member;
   moving the member to position the article in registration with the substrate;
   simultaneously rotating the member during the movement thereof so that the lead on the article is positioned for insertion in a predetermined aperture in the substrate; and
   urging the article from the member and displacing said article towards the substrate to insert the lead on the article into the aperture.

2. The method according to claim 1 further including the step of selectively presenting one of a plurality of different types of articles, each having a lead thereon, to the member for engagement thereby.

3. The method according to claim 2 wherein the selectively presenting step comprises the steps of:
   storing each of the different types of articles in a stack on one of a plurality of sides of a multi-sided carousel; and
   indexing the carousel to position a selected side thereof opposite said member so that an article on the selected side is positioned for engagement by the member.

4. The method according to claim 3 wherein the moving step comprises the step of displacing the member along a lateral path parallel to the plane of the substrate between the carousel and an overlying, slidably mounted ram having a depending insertion tool so that when the member is displaced beneath the ram, the article engaged by the member is interposed between the insertion tool and the substrate.

5. The method according to claim 4 wherein the article is urged from the member by displacing the ram towards the member so the insertion tool forces the article towards the substrate.

6. The method according to claim 4 further including the step of selectively indexing the substrate beneath the ram to locate a predetermined aperture beneath the insertion tool.

7. A method for automatically inserting a lead on an article into an aperture in a substrate comprising the steps of:
- selectively presenting one of a plurality of different articles, each having a lead thereon, to a rotatable member;
- removably engaging the presented article in the member;
- moving the member to position the article engaged thereby in registration with the substrate;
- simultaneously rotating the member during the movement thereof so that the lead on the article is positioned for insertion in a predetermined aperture in the substrate; and
- urging the article from the member and displacing the article towards the substrate to insert the lead into the predetermined aperture.

8. The method according to claim 7 wherein the selectively presenting step comprises the steps of:
- storing each of the different types of articles on one of a plurality of sides of a multi-sided carousel; and
- indexing the carousel to position a selected side thereof opposite said member so that one of the articles stored on said selected side is positioned for engagement by said member.

9. A method for inserting leads on an edge connector into apertures in a backplane comprising the steps of:
- engaging an edge connector in a rotatable member;
- moving the member to position the edge connector in registration with the backplane;
- simultaneously rotating the member during the movement thereof so that the leads on the edge connector engaged by the member are positioned for insertion into predetermined apertures in the backplane; and
- urging the edge connector from the member and towards the backplane to insert the leads of the edge connector into the predetermined apertures.

10. The method according to claim 9 further including the step of selectively presenting one of a plurality of different types of edge connectors to the member for engagement thereby.

11. A method for inserting leads on an edge connector into apertures in a backplane comprising the steps of:
- loading a plurality of different types of edge connectors onto separate sides of a multi-sided carousel;
- indexing the carousel to present a selected one of the sides thereof to a rotatable nest;
- removably engaging in the nest one of the edge connectors stored on said selected side of the carousel;
- moving the nest to position the edge connector engaged thereby in registration below a ram and above a set of predetermined apertures in the backplane;
- simultaneously rotating the nest during the displacement thereof so that the leads on the edge connector are positioned for insertion in the predetermined apertures in the backplane; and
- displacing the ram towards the nest to urge the edge connector therefrom and towards the substrate to insert the leads of the edge connector into the predetermined apertures.

12. Apparatus for inserting a lead on an article into a corresponding aperture in a substrate comprising:
- a rotatable member adapted to engage at least one article therein;
- means for moving the member so that the article engaged thereby is positioned in registration with the substrate;
- means for simultaneously rotating the member during the movement thereof so that the lead on the article is positioned in alignment with a corresponding aperture in the substrate; and
- means for disengaging the article engaged by the member and for displacing the article towards the substrate so that the lead is inserted in the corresponding aperture.

13. The apparatus according to claim 12 wherein the member is adapted to receive a pair of articles therein.

14. The invention according to claim 12 further including means for selectively presenting one of a plurality of different types of articles, each having a lead thereon, to the member for engagement thereby.

15. The apparatus according to claim 12 wherein said article presenting means comprises:
- a multi-sided carousel rotatable about an axis normal to the path of movement of said member;
- a plurality of article carriers each releasably attached to a separate one of the sides of the carousel for carrying a plurality of articles therein stacked one above the other such that each lead on each article has its longitudinal axis parallel to the plane of the substrate;
- means within each article carrier to prevent the articles stacked therein from falling therethrough when the article carrier is disengaged from the carousel; and
- means for indexing the carousel to position a selected one of the article carriers opposite to said member.

16. The apparatus according the claim 12 wherein said means for rotating said member comprises:
- a pair of spaced, parallel plates, each having a slot therein parallel to the path of member movement, and each plate having a cammed channel in communication with one end of said slot; and
- a pair of rollers extending outwardly in opposite directions from said member toward said plate to ride along said slots and said cammed channels.

17. An apparatus for inserting leads on an edge connector into predetermined apertures in a substrate comprising:
- a nest for removably engaging an edge connector therein;
- means for selectively presenting one of a plurality of different types of edge connectors for engagement in said nest;
- means for moving the nest to position the article engaged therein in registration with the substrate;
- means for simultaneously rotating the nest during the displacement thereof so that the leads on the edge connector are positioned for insertion into predetermined apertures in the substrate; and
- means for urging the edge connector from the nest and displacing the edge connector towards the backplane to insert the leads into the predetermined apertures.

18. An apparatus for inserting leads on an edge connector into predetermined apertures in a backplane comprising:
- a frame;

a table slidably mounted to said frame, said table carrying the backplane thereon;

a multi-sided carousel rotatably mounted to said frame for storing a plurality of different types of edge connectors on separate sides thereof;

means for indexing the carousel on said frame to position a selected side thereof opposite said table;

a ram slidably mounted to said frame above said table for reciprocal movement to and from said table along an axis normal to the path of table movement on said frame;

a nest for removably engaging an edge connector on said selected side of said carousel;

means for displacing said nest on said frame between said selected side of said carousel and a position interposed between said ram and said table; and means for simultaneously rotating the nest during the displacement thereof so the leads on the edge connector engaged in the nest are positioned for insertion into predetermined apertures in the backplane.

* * * * *